United States Patent [19]

Finlay

[11] Patent Number: 4,865,879
[45] Date of Patent: Sep. 12, 1989

[54] METHOD FOR RESTORING AND REINFORCING WOODEN STRUCTURAL COMPONENT

[76] Inventor: Gordon Finlay, 382 Wailupe Circle, Honolulu, Hi. 96821

[21] Appl. No.: 176,020

[22] Filed: Mar. 31, 1988

[51] Int. Cl.$^4$ .................. B05D 3/02; B32B 35/00; B23P 7/00
[52] U.S. Cl. .................. 427/140; 29/402.18; 264/36; 427/393; 428/425.1
[58] Field of Search .................. 427/393, 140; 29/402.18; 264/36; 428/425.1

[56] References Cited

U.S. PATENT DOCUMENTS

| | | |
|---|---|---|
| 1,111,909 | 9/1914 | Kramer . |
| 1,883,196 | 10/1932 | Wertz . |
| 1,926,415 | 9/1933 | Wertz . |
| 1,953,452 | 4/1934 | Wertz . |
| 2,187,324 | 1/1940 | Many . |
| 2,229,264 | 1/1941 | Wertz . |
| 3,564,859 | 2/1971 | Goodman . |
| 3,716,608 | 2/1973 | Neumann . |
| 3,900,541 | 8/1975 | Klapwijk . |
| 4,060,953 | 12/1977 | Milne . |
| 4,086,309 | 4/1978 | Alberts . |
| 4,295,259 | 10/1981 | Rhodes et al. . |
| 4,661,532 | 4/1987 | Morin . |

FOREIGN PATENT DOCUMENTS

2156887 10/1985 United Kingdom .

*Primary Examiner*—Michael Lusignan
*Attorney, Agent, or Firm*—Armstrong, Nikaido, Marmelstein, Kubovcik & Murray

[57] ABSTRACT

A method for reinforcing in-place a hollow wooden structural component, in particular a damaged utility pole, by injecting into the internal cavities of the structural component a polyurethane composition which forms, upon curing, a rigid polyurethane having a density of at least 40 lbs/ft$^3$ and a flexural strength of at least 3,000 psi. The polyurethane composition is produced in situ by continuously metering and blending an isocyanate-containing liquid component and a polyol-containing liquid component.

8 Claims, 1 Drawing Sheet

METHOD FOR RESTORING AND REINFORCING WOODEN STRUCTURAL COMPONENT

This invention relates to a method for restoring and reinforcing a structural component by injecting into the internal cavities of this structural component a resin composition. In particular, this invention relates to the repair of damaged utility poles without removing the poles from their location in the ground.

The standard utility pole is usually a wooden pole which has been treated with creosote or other preservative materials to resist termite, dry rot and other forms of attack on the wood structure. In the case of creosote treatment, the creosote normally cannot penetrate into the heart wood, and only protects the exterior shell to a depth of 1 to 3 inches. The interior of the creosote-treated pole is susceptible to termite attack, which can remove almost completely the interior, non-protected wood, resulting in a thin-walled, hollow pole characterized by a plurality of internal cavities. Most of these internal cavities are interconnected with each other to form a large internal cavity running the length of the pole. As a result, the pole strength is substantially reduced. Typically, by the time the damage to the pole is discovered, the extent of damage is so great that it is often necessary to replace the pole.

The replacement of a utility pole is often complicated by its roadside location and by the relatively large number of utility lines which it supports. In urban areas these lines may include not only electric power lines, but also wirings for telephone, cable television, and traffic control. In addition, the pole may also support electrical hardware such as transformers.

In view of the above considerations, there is a great need for a method for strengthening utility poles in-place, to eliminate the high costs of removing and re-stringing the lines supported by the poles. Various attempts at strengthening the lower portion of the pole with grouted shields, usually at the foot portion of the pole, were not satisfactory because failures subsequently developed above the shielded section of the pole. The inventor of the method of this invention experimented with injecting epoxy compositions into the internal cavities of utility poles. However, the poles treated with the epoxy materials could not withstand the design loads required of utility poles.

SUMMARY OF THE INVENTION

An object of this invention is to restore in-place a damaged utility pole to a bending strength which is in excess of 80%, and even in excess of 100%, of the bending strength of an equivalent new pole made of the same wood and having approximately the same dimensions as the restored pole. In the method of this invention, a wooden hollow structure such as a damaged utility pole characterized by a plurality of internal cavities is injected in situ with a polyurethane composition which forms, upon curing, a material having a density of at least 40 lbs/ft$^3$ and a flexural strength of at least 3,000 psi. The polyurethane material fills the cavities inside the pole, and also bonds to the remaining wood in the damaged pole.

DESCRIPTION OF PREFERRED EMBODIMENT

Figure 1:
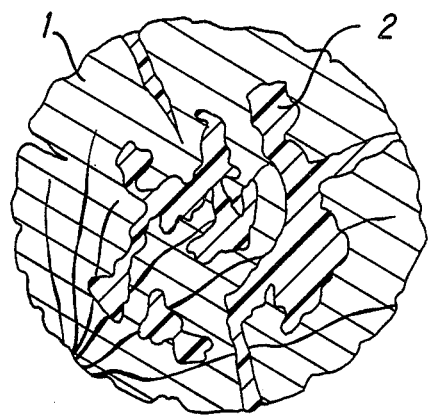
FIG. 1 is a drawing of a cross-section of a wooden utility pole reinforced by the method of this invention, wherein 1 is the wood remaining in the damaged pole, and 2 is the polyurethane filling.

In the method of this invention, any polyurethane composition may be used as long as it provides, upon curing, a rigid polyurethane composition which is characterized by a density of at least 40 lbs/ft$^3$ (or 640 Kg/m$^3$), preferably from 40 to 70 lbs/ft$^3$, and more preferably from 60 to 65 lbs/ft$^3$; and a flexural strength of at least 3,000 psi, preferably from 3,000 to 5,000 psi, and more preferably from 3,500 to 4,500 psi.

Polyurethanes are derived from the reaction of polyols (which may be polyesters or polyethers) with di- or polyisocyanates to produce complex structures containing the urethane linkage

in their backbone structure.

In the method of this invention, the polyurethane composition is provided in two separate liquid components (an isocyanate-containing component, and a polyol-containing component) which are mixed just prior to injection into the utility pole.

The polyurethanes which can be used in the method of this invention can be (1) rigid, solid, non-foamed materials, or (2) rigid, high-density foams characterized by a small expansion ratio which is between 1:1 and 1.5:1, the expansion ratio being the ratio of the volume of the fully foamed product to the corresponding volume before foaming. The rigid, solid, non-foamed polyurethanes and the rigid, high-density polyurethane foams which can be used in the method of this invention have very similar characteristics, can be produced from the same starting materials, and can be injected by using the same equipment. The major difference between the rigid, solid polyurethanes and the rigid, high-density foams lies in the use of a blowing agent in the production of the latter. Historically, the development of polyurethane technology was associated with the development of foamed polyurethanes, which are more important commercially than solid polyurethanes. Therefore, the polyurethanes which can be used in the method of this invention could be also viewed conceptually as rigid, high-density polyurethane foams or the corresponding non-foamed polyurethanes.

Polyurethane foams are commonly classified as flexible foams or rigid foams, which are both commercially important. Flexible foams are slightly cross-linked, and rigid foams are highly cross-linked. Both rigid and flexible polyurethane foams are produced by forming a polyurethane polymer concurrently with a gas evolution process. The density of the foam is controlled by controlling the degree of gas evolution.

The polyurethane foams used in the process of this invention fall in the category of rigid or highly cross-linked foams. The most common application of rigid polyurethane foams is in poured-in-place or sprayed insulation. The rigid polyurethane foams used for insulation typically have a low density in the range 2–4 lb/ft$^3$ (or 32–64 Kg/m$^3$). In contrast, the rigid polyurethane foam used in the method of this invention has a much greater density of at least 40 lb/ft$^3$. The use of very high-density, non-expanding rigid polyurethane foam in the method of this invention is an unusual application of rigid polyurethane foam technology, which was developed originally for providing a material having a high expansion ratio and a low density. In fact, in the few publications which disclose a broad range of densities for rigid polyurethane foam, the highest upper limit disclosed appears to be 60 lbs/ft$^3$, and practical applications are disclosed only for polyurethane foams having a maximum density of 30 lbs/ft$^3$.

In the method of this invention, the rigid polyurethane material (whether a solid or a foam) is produced in situ by continuously metering two liquid components in a desired proportion and blending them just immediately before injecting the resulting mixture into the internal cavities of the wooden structural component. The first liquid component is a blend consisting mostly of at least one polyol, and the second liquid component is a blend consisting mostly of at least one isocyanate. The reaction of the isocyanate with the polyol results in a polyurethane polymer. In the case of a foamed material, the heat of reaction between the isocyanate and the polyol causes a liquid blowing agent incorporated into the polyol blend to volatilize to form bubbles throughout the structure of the polyurethane polymer to give a foamed structure. In the method of this invention, the small expansion in volume associated with foaming of the polyurethane is helpful for filling smaller crevices in the internal cavities of the wooden structural component. However, even in the absence of volume expansion due to foaming, the injection at relatively high pressure of the polyurethane composition which has a low viscosity is sufficient to fill more than 90% of the void spaces inside the utility pole.

The rigid polyurethane materials having a density of at least 40 lbs/ft$^3$ which are used in the method of this invention are characterized by a flexural strength of at least 3,000 psi. This flexural strength gives the restored utility pole a bending strength which is almost as high as, and sometimes even higher than, the bending strength of an equivalent new pole.

Premixed components for the rigid polyurethanes which are suitable for use in the method of this invention may be obtained from commercial suppliers. The density of polyurethane foams can be easily adjusted by increasing or decreasing the amount of blowing agent. The blowing agent can also be completely eliminated to give a solid polyurethane material. Therefore, even commercial suppliers of polyurethane who do not carry in stock premixed components for the rigid, solid polyurethanes or the very high-density rigid polyurethane foams required for the method of thin invention can readily adjust their products for use in the method of this invention.

Typically, the liquid polyol-containing component (hereinafter referred to as "polyol component") of a rigid polyurethane composition is a blend of branched polyols of relatively low molecular weight (c. 500) and catalysts. Plasticizers may be added to the polyol component to adjust the viscosity of the liquid component, and also to adjust the curing time, flexibility and toughness of the polyurethane end-product. Surfactants may be included in the polyol component to promote production of a uniformly textured foam.

The polyols used in the polyol component of rigid polyurethanes are branched polyether polyols of relatively low molecular weight (e.g., 500), as contrasted to the high molecular weight polyols used in flexible polyurethane. The low molecular weight polyols give a higher degree of cross-linking, which is required in rigid polyurethane. A preferred class of polyols, which are widely available commercially, are the reaction products of a mono-, di- or polysaccharide (such as glucose, sucrose, and starch) with an alkanolamine (such as diethanolamine). In addition to the polyether polyols, the polyol component of rigid polyurethane compositions may contain a short-chain glycol extender.

Typical catalysts for the reaction between the polyols and isocyanates are tertiary amines (such as triethylene diamine; or 1,4-diazo [2,2,2]-bicyclo-octane, which is commercially known as DABCO), and organo-metallic compounds (such as stannous 2-ethylhexoate, dibutyl tin dilaurate, or stannous octoate). A combination of an amine catalyst and an organo-metallic catalyst may be used.

Examples of well-known plasticizers which can be used in the polyol component are phthalate esters, adipate esters, and sebacate esters.

Typical surfactants which can be used in the polyol component are water-soluble silicone derivatives.

The polyol component for a polyurethane foam composition typically contains a volatile blowing agent, such as trichlorofluoromethane which is a commonly used blowing agent. The blowing agent may also be incorporated in the isocyanate component of the polyurethane foam.

The polyol component optionally may contain an antihydrophilic material, such as commercial coal tar, which imparts hydrophobic properties to the polyurethane formulation.

The isocyanate most commonly used in the formulation of rigid polyurethane is polymethylene polyphenyl isocyanate (PMDI) which is available commercially. A commercial blend of PMDI and diphenyl methane diisocyanate (MDI) can also be used in formulating rigid polyurethane.

The liquid isocyanate-containing component (hereinafter referred to as "isocyanate component") may also contain plasticizers. The plasticizers which are usable in the polyol component can be used also in the isocyanate component.

The viscosity of the isocyanate component may be adjusted by the addition of plasticizers, and also by working a small portion of the polyol component into the isocyanate component to form a partial prepolymer.

It is preferable to formulate the two liquid components (polyol component and isocyanate component) for the rigid polyurethane so that a mixture of equal volumes of the respective liquid components gives the desired formulation for the polyurethane. Typically, the desired formulation contains a slight stoichiometric excess of the isocyanate group over the hydroxyl group.

The following is an example of a formulation for a high-density rigid polyurethane foam.

TABLE 1

| Formulation for rigid polyurethane foam | |
|---|---|
| Ingredient | Parts by weight |
| PMDI | 140 |
| polyol[a] | 100 |
| catalyst[b] | 2 |
| trichlorofluoromethane | 1 |

[a]Sucrose-based polyether polyol
[b]Mixture of dibutyl tin laurate and tertiary amines For the method of this invention, it is preferable that the viscosity of each of the two liquid components for the polyurethane composition not exceed 700 cps, preferably not exceed 300 cps. A viscosity in excess of 700 cps would retard too greatly the rate of injection, and cause strain on the injecting equipment. A preferred range for the viscosity of the liquid components is 100–300 cps. The viscosity of the liquid components may be reduced, for example, by adding plasticizers.

A commercial rigid polyurethane which is particularly suitable for use in the method of this invention is the product sold in 1988 under the name BUC CUWR-15 RIGID SOLID URETHANE by BURTIN URETHANE CORPORATION, Santa Ana, Calif. BUC CUWR-15 is a two-component system wherein Component A is the isocyanate component and Component B is the polyol component. Component A is a phthalate-plasticized blend of PMDI and MDI. Component B is an anti-hydrophilic, phthalate-plasticized blend of a sucrose glycerine polyether polyol, glycerine triol, and metallic catalyst.

The characteristics of Component A and Component B are shown in the following Table 2.

TABLE 2

| | Liquid Components (@ 75° F.) | |
|---|---|---|
| | Component A | Component B |
| Viscosity (cps) (ASTM D-1638) | 150 | 300 |
| Specific gravity (g/cc) (ASTM D-1638) | 1.18 | 1.06 |

The mixing ratio of Component A to Component B is 50/50. The curing time at 75° F. is in the range of 1–48 hours and depends on the shape and size of the cured polyurethane. The characteristics of the cured polyurethane obtained from BUC CUWR-15 are shown in the following Table 3.

TABLE 3

| | Solid Polyurethane (@ 75° F.) | |
|---|---|---|
| Property | ASTM Method | Value |
| Density (lb/ft$^3$) | D-638 | 60 |
| Flexural strength (psi) | D-790 | 4,000 |
| Compressive strength (psi) | D-695 | 5,000 |
| Hardness (shore D) | — | 65 |
| Color | — | tan |

In a preferred embodiment of the method of this invention for repairing a damaged wooden utility pole, holes of ⅝ inch to ¾ inch are drilled throughout the outer shell to reach into the inner cavities of the pole. The spacing and arrangement of the drilled holes are varied according to the condition of the individual pole, that is, according to the extent and location of the inner cavities inside the pole. The condition of the pole can be determined by tapping the surface of the pole with a hammer, and judging the extent of damage from the sound rendered by the tap. More sophisticated sonic "mapping" techniques may also be used. Typically, holes are drilled at 1-foot intervals in rotating quadrants. If necessary, the pole may be wrapped and taped to prevent leakage of the injected composition through deep weathering cracks or existing holes in the wood.

The two-part polyurethane composition (consisting of an isocyanate component and a polyol component) is injected into the internal cavity of the utility pole, using a proportioning unit which provides pressure for the injection and also heats the components of the polyurethane mixture to a temperature in the range of 110°–140° F. in order to reduce their viscosity. The composition is mixed immediately before injection, and is injected into the cavity of the pole, using a pressure in the range of 300–1,600 psi, preferably 300–1,100 psi. For example, a proportioning unit (Model No. FF-1600) and an application gun (Model No. AR-C) manufactured by the Gusmer Corporation can be used. In this particular system, the two liquid components A and B are carried respectively to the injection point through a low-voltage, dual heated hose assembly connected to an automatic, mechanical, self-cleaning pour-gun which mixes and disperses the two components using a pneumatically triggered impingement mixing method.

In addition to the above described equipment, any equipment or system can be used which maintains the two liquid components of the polyurethane composition at the proper temperature, and provides proper pressure as well as proper proportioning of the two components.

The application of the polyurethane composition strives to completely fill the cavities inside each section of the pole from the nearest injection point (drilled hole). The polyurethane composition is injected from each drilled hole until the backflow of polyurethane indicates that the cavity (or portion of cavity) which has been tapped through this hole has been filled. Usually, the injection begins at the bottom of the pole and progresses upwards. As the injection through each drilled hole is completed, that hole is sealed with a plug, and the injection is continued from the next hole above. The quantity of polyurethane composition which is injected in the cavity of the pole varies with the condition of the pole, and is basically controlled by stroke counter at the proportioning unit.

The pressure used for the injection of the polyurethane composition may be adjusted as necessary as the injection progresses in each pole. A pressure at the low end of the range of 300–1,600 psi is used if the portion of the pole which is being filled is structurally very weak due to the large extent of damage. In filling the portions of the pole which are less damaged, a higher pressure may used. A higher pressure is also used for filling the uppermost portion of the pole, so that the injection can be completed from a point of injection below the top portion, in order for workers to avoid coming close to the wirings at the top portion of the pole.

In the particular case of a pole which has a high moisture or water content in its internal cavities, excessive foaming may result from the evolution of carbon dioxide gas which accompanies the reaction of the isocyanate with water. In such a case, it is preferable to dry the internal cavities before injecting the polyurethane composition. This drying can be accomplished with a heat gun (commonly used for stripping paint) provided with a nozzle and connected to the compressor of the proportioning unit. By this mechanism, hot air is injected into the cavities of the pole to evaporate the water and drive it out of the internal cavities. When the portion of the pole having a high moisture content is below the ground level and cannot be dried easily by the heat-gun method, the following steps may be taken. Before injecting the mixture of isocyanate component and polyol component, the internal cavities of the pole are first injected with a small amount of the isocyanate component only. The isocyanate reacts with the water and carbon dioxide is released. However, in the absence of the polyol component, no polyurethane polymer has been formed yet, so that the release of carbon dioxide does not result in the formation of a foamed polyurethane. Then, the injection is continued with the mixture of the isocyanate component and polyol component.

The polyurethane composition forms a gel in approximately 120 seconds after the two components are mixed, and approximately 20–40 seconds after the mixture is injected into the cavities of the pole. Approximately 10 minutes after completion of the injection, any tape or covering which may have been used is removed from the surface of the pole. Then, any excess polyurethane foam deposited on the surface of the pole is removed, and the surface of the pole is smoothed, if necessary. At this point, restoration of the utility pole is completed. A great advantage of the method of this invention is that the process steps are completed, and the restoration site can be cleaned up and vacated, before the injected polyurethane composition has completely cured. It is not necessary to wait until complete curing of the polyurethane, which usually takes place in a period in the range of 4–24 hours, depending on the length and girth of the utility pole and the size of the filled cavities.

The method of this invention results in the filling of approximately 90–95% of the void spaces or internal cavities in the utility pole with the rigid polyurethane. The polyurethane adheres strongly to the remaining wood fibers in the cavities. Where deep weathering vertical cracks exist which extend from the surface of the pole to the internal cavities, the injected rigid polyurethane fills the cracks and binds together the vertical pole sections separated by each crack, thereby sealing out moisture and insects.

The method of this invention is described in reference to a preferred embodiment which is the restoration of a damaged utility pole. However, the method of the invention is not limited to the described embodiment, and can be applied for restoring and strengthening in-place any wooden structural component which is characterized by at least one internal cavity which can be injected with the polyurethane composition described herein.

I claim:

1. A method for restoring mechanical strength in situ to a wooden structural component which has reduced mechanical strength due to the presence of at least one internal cavity, comprising the steps of forming at least one hole in the surface of said wooden structural component to reach into said internal cavity, and injecting into the internal cavity of said wooden structural component through the formed hole a polyurethane composition which forms upon curing a rigid polyurethane having a density of at least 40 lbs/ft$^3$ and a flexural strength of at least 3,000 psi, wherein said polyurethane composition is produced in situ by continuously metering and blending immediately prior to the injection step (A) an isocyanate-containing liquid component and (B) a polyol-containing liquid component, whereby the isocyanate reacts with the polyol to form said polyurethane and the mechanical strength of the wooden structural component is increased after the polyurethane is cured.

2. The method of claim 1, wherein the density of said rigid polyurethane is from 40 to 70 lbs/ft$^3$.

3. The method of claim 1, wherein the density of said rigid polyurethane is from 60 to 65 lbs/ft$^3$.

4. The method of claim 1, wherein the flexural strength of said rigid polyurethane is from 3,000 to 5,000 psi.

5. The method of claim 1, wherein the flexural strength of said rigid polyurethane is from 3,500 to 4,500 psi.

6. The method of claim 1, wherein said rigid polyurethane is solid polyurethane.

7. The method of claim 1, wherein said rigid polyurethane is a foam characterized by an expansion ratio greater than 1:1, but not greater than 1.5:1.

8. The method of claim 1, wherein said wooden structural component is a utility pole.

* * * * *